Jan. 3, 1939.    T. M. HAGENBOOK    2,142,310
SPEED CONTROL MECHANISM
Original Filed July 18, 1935    3 Sheets-Sheet 3

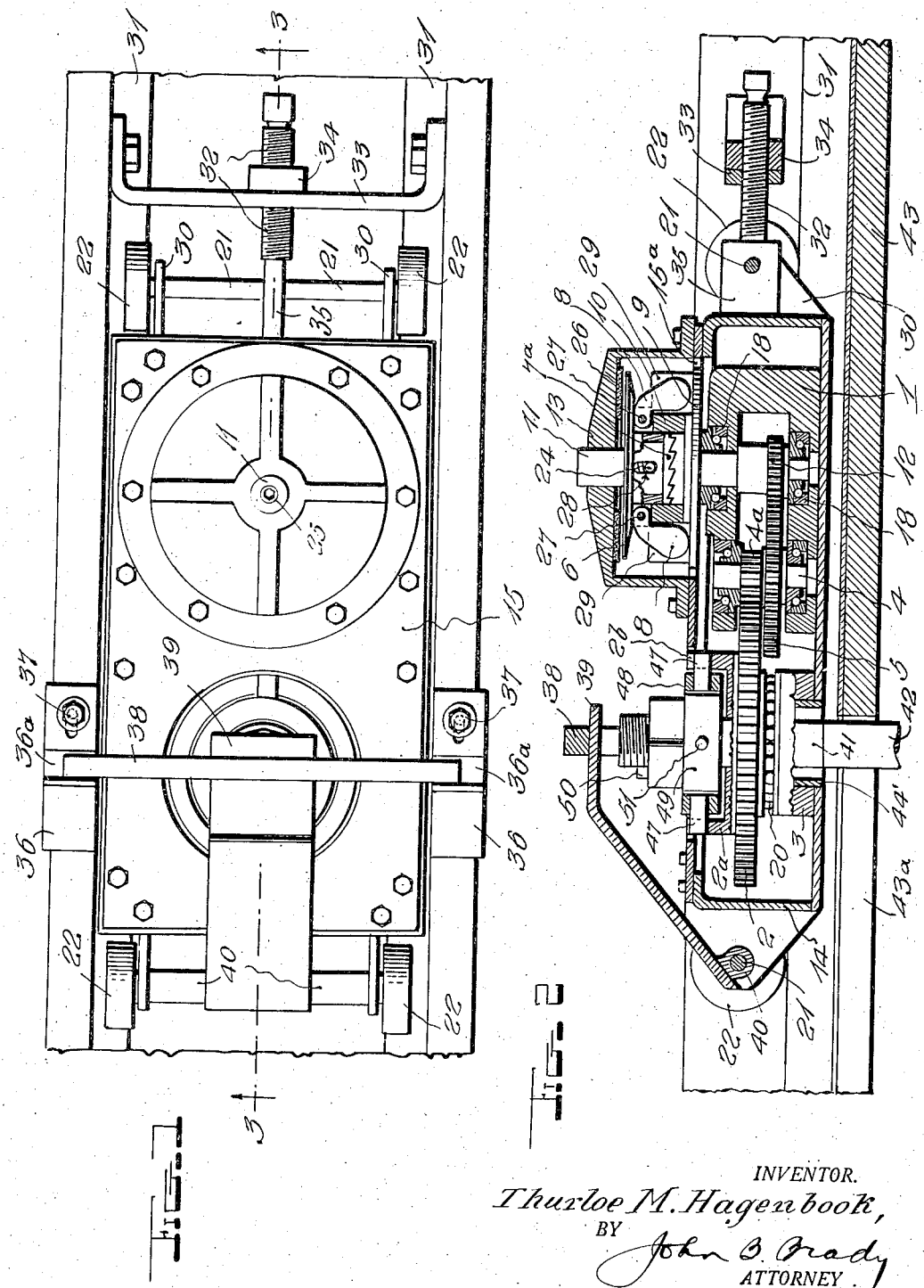

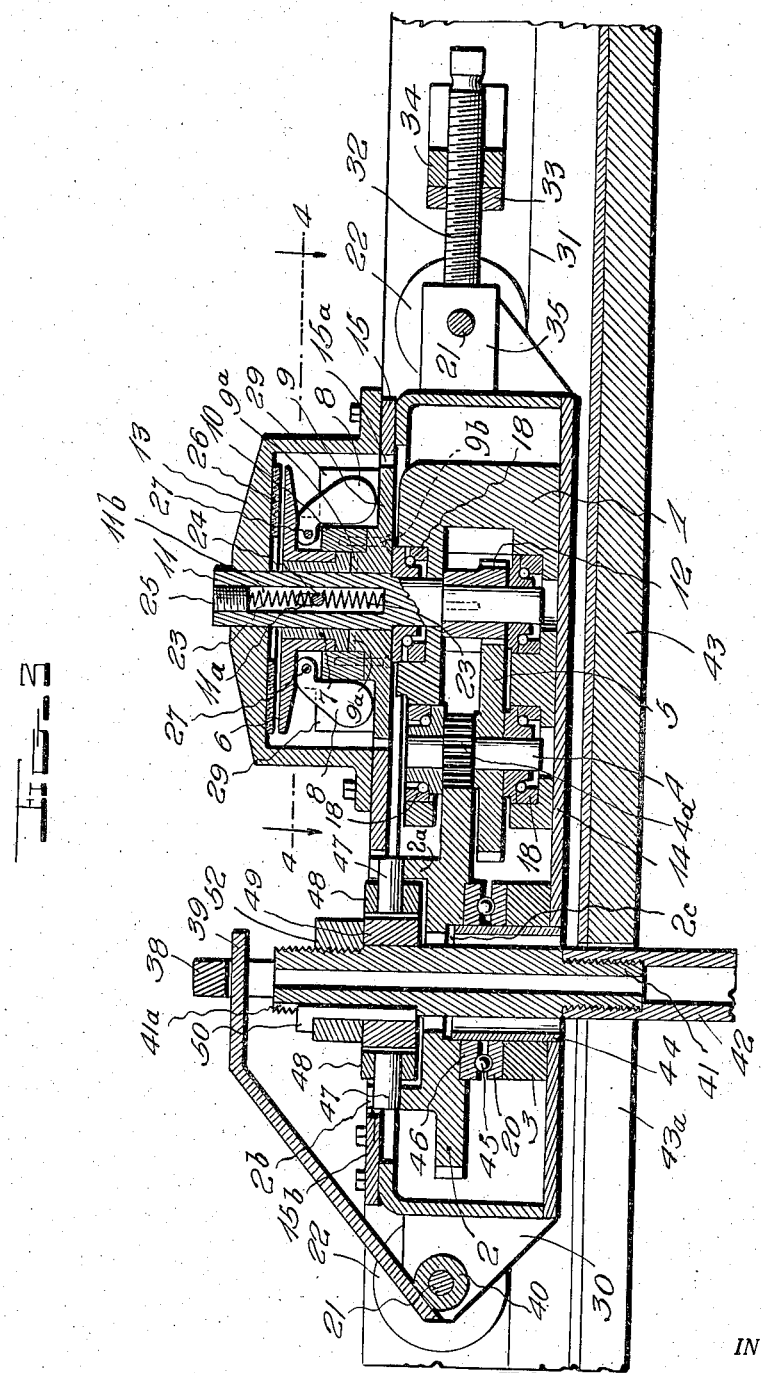

INVENTOR.
Thurloe M. Hagenbook,
BY John B. Brady
ATTORNEY

Patented Jan. 3, 1939

2,142,310

UNITED STATES PATENT OFFICE 2,142,310

SPEED CONTROL MECHANISM

Thurloe M. Hagenbook, Evansville, Ind., assignor to International Door Company, Evansville, Ind., a corporation of Illinois Original application July 18, 1935, Serial No. 32,125. Divided and this application February 11, 1938, Serial No. 190,080

8 Claims. (Cl. 188—180)

My invention relates broadly to speed control mechanisms and more particularly to a construction of revolving door speed control mechanism.

This application is a division of my application Serial No. 32,125, filed July 18, 1935, for Revolving door speed control.

One of the objects of my invention is to provide a speed control mechanism directly geared with rotary means connected with the revolvable shaft of a revolving door, having means for limiting the speed of rotation of the revolving door and subjecting the revolving door to a braking action under conditions of excessive deceleration of the revolving door.

Another object of my invention is to provide a construction of speed control mechanism for revolving shafts which includes a shiftable friction disc coacting with an adjacent friction member and controllable by a plurality of centrifugally displaceable members operating to effect an engagement between the friction disc and coacting friction member under conditions of either excessive acceleration or excessive deceleration.

Still another object of my invention is to provide a centrifugal control mechanism in which a flywheel carries a multiplicity of pivotally mounted weights adapted to move under conditions of excessive speed to effect engagement of a friction brake, and to insure an effective braking of the revolving shaft under conditions of excessive retarding of the revolving shaft.

A further object of my invention is to provide a construction of speed control mechanism for a revolving shaft in which a flywheel device carries a multiplicity of radially disposed flyweights which are operative under conditions of centrifugal force for preventing abnormal speed of rotation of a revolving shaft, and operative through a clutch and friction disc mechanism for braking the revolving shaft under conditions of abrupt arresting of the movement of the revolving shaft.

Figure 4:
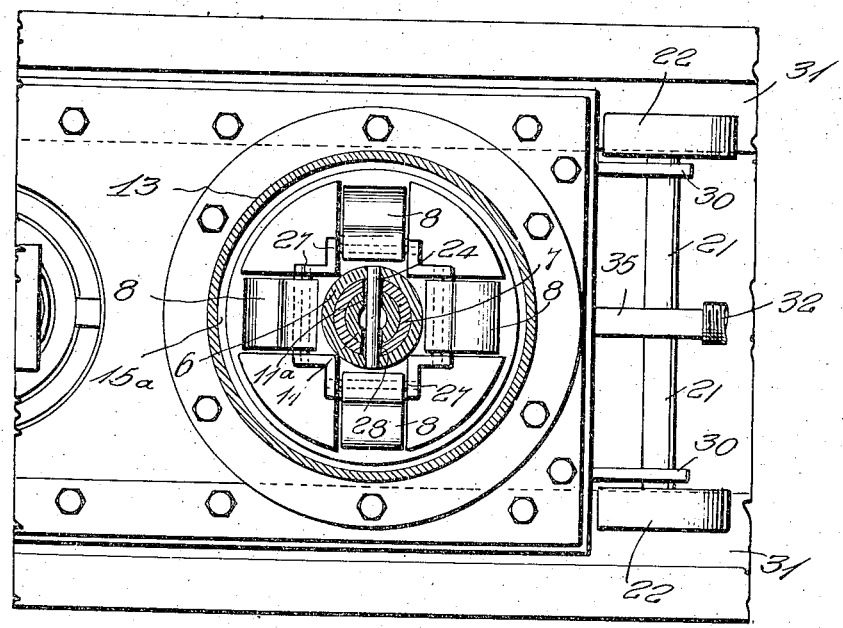
Figure 5:
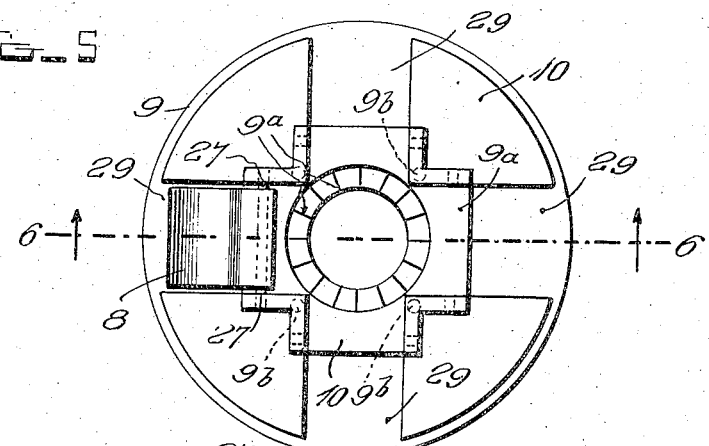
Figure 6:
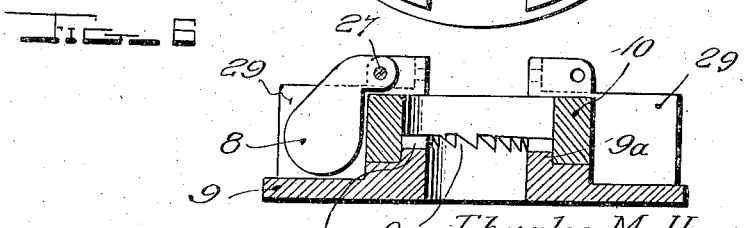

Other and further objects of my invention reside in a construction of combined trolley and speed control mechanism for revolving doors, as set forth more fully in the specification hereinafter following by reference to the accompanying drawings, in which:

Figure 1 is a plan view of the speed control mechanism of my invention combined with the trolley structure of a revolving door; Fig. 2 is a vertical longitudinal sectional view through the combined structure shown in Fig. 1, with certain of the parts in elevation; Fig. 3 is a vertical sectional view taken on line 3—3 in Fig. 1; Fig. 4 is a horizontal sectional view of the speed control mechanism in particular, taken on line 4—4 in Fig. 3; Fig. 5 is a plan view; and Fig. 6 is a vertical sectional view on line 6—6 of Fig. 5, of the flywheel assembly employed in the speed control mechanism of my invention showing one pivotal weight in mounted position.

My invention is embodied in a compact assembly of combined trolley and speed control mechanism mounted within a casing which is carried upon roller members engaging rails by which the casing may be guided to a central assembled position or retracted to a position at one side of the drum of the revolving door. The casing is provided with a multiplicity of aligned extensions which are apertured for the passage of rod members which support the rollers, which in turn engage the guide rails. The casing provides a housing for both the journal mechanism for the upper end of the shaft of the revolving door and also the speed control mechanism. The construction of the speed control mechanism of my invention is such that precision control of the revolving door is secured. That is, the revolving door cannot exceed a reasonably safe speed of rotation. Moreover, in the event of abrupt deceleration of the door, such as would occur in the case of accident where a person might be caught between one of the door wings and the side wall of the drum of the door, the speed control mechanism responds immediately to brake the rotation of the door.

In order to produce the braking action on the revolving door, both under conditions of excessive increase in speed and abrupt deceleration, I provide a construction of flywheel for the speed control mechanism which is provided with a plurality of radially disposed pockets within which separate weights are pivotally mounted and free to be displaced under conditions of centrifugal force for actuating a brake. Rotary movement is normally imparted to the flywheel which carries the several pivotally mounted flyweights through a geared connection with the revolving door. The flywheel is provided with a clutch plate having cam or ratchet shaped teeth thereon. A friction disc is provided with a sleeve concentrically disposed about a clutch member, through which the driven shaft extends and which is provided with clutch or cam faces operative to engage the clutch or cam faces on the carrier.

The friction disc is arranged to coact with a brake surface carried by the casing of the speed control mechanism. The centrifugal weights act to displace the friction disc into position for effecting engagement between the friction disc and the brake surface without the disengagement of the coacting clutch or ratchet faces. Under conditions of abnormal speeds the pivotally mounted centrifugal weights are driven outwardly tending to raise the friction disc into engagement with the coacting brake lining for retarding the rotation of the driven shaft. Under conditions of abrupt arrest of movement of the revolving door, the driven shaft is arrested in movement but the flywheel tends to continue rotation and in so doing produces a displacement between the coacting clutch or ratchet faces, producing a displacement of the friction disc sufficient to establish engagement with the brake surface thereby producing a braking action on the revolving shaft. The construction of the speed control mechanism is very compact, as the vertical dimension of the casing of the speed control mechanism does not exceed the maximum vertical dimension of the locking means by which the trolley is maintained either in a central or retracted position.

Referring to the drawings, reference character 1 designates a yoke casting which supports the bearings for the speed control shaft 11 and also countershaft 4. The bearing races supported by the yoke 1 are indicated at 18. The shaft 11 carries a pinion gear 12 which meshes with gear 5 carried by countershaft 4. The main shaft 11 passes freely through the clutch plate 9 having an upwardly extending clutch face indicated at 9a coacting with the complementary part of the clutch 7 having downwardly depending clutch faces 7a. The coacting part of the clutch 7 forms a carrier for the friction disc 6 which coacts with the asbestos brake lining 26 carried on the lower portion of the housing 13. The sleeve portion of the clutch 7 is slotted, as indicated at 28, which slot is aligned with the elongated aperture 11a in shaft 11 through which the pin 24 passes for the purpose of driving the coacting part of clutch 7 and correspondingly driving the clutch face 7a and the friction disc 6. The friction disc 6 is pinned to the shaft 11 by pin 24 passing through slot 28 in the coacting clutch member 7. It will be observed from Fig. 2 that the slot 28 allows the friction disc 6 to be raised or lowered through a distance substantially equal to the height of the coacting clutch faces 7a and 9a with respect to the asbestos brake lining 26, without affecting the engagement or disengagement of clutch face 7a with clutch face 9a, under control of the centrifugal weights 8 which are pivoted at 27 to carrier or flywheel 10.

The carrier 10 not only serves as a means for pivotally mounting centrifugal weights 8 but also serves in itself as a centrifugal mass or flywheel. The flywheel 10 is provided with radially disposed pockets 29 within which the pivotally mounted weights 8 are adapted to be radially displaced within the limits of the housing 13. The clutch plate 9 coacts with the flywheel 10 and is secured thereto by suitable connecting means indicated generally at 9b.

I provide counterbalancing springs 23 on opposite sides of pin 24 housed within the bore 11b of shaft 11 and confined by means of screw plug member 25 engaging screw threads in the upper end of bore 11b. The housing 13 is supported on plate member 15 which forms the upper closure member for the main housing 14 which is apertured at 15a for the passage of the speed control mechanism and at 15b for the passage of the universal joint mechanism as will be hereinafter more fully described.

The main housing 14 is formed from a pressed steel plate having welded ends. At the ends of the main housing 14, I provide welded extensions 30 which are apertured for the passage of rod members 21 which support rollers 22 which engage rails 31 which extend substantially diametrically across the drum of the door. The roller members 22 which engage the rails 31 may be moved from a position adjacent one side of the drum of the door to a position substantially centrally of the drum and located in position by means of the set screw 32 which extends through the laterally disposed member 33 and is secured in a selected position by means of lock nut 34 to provide an abutment for the extension 35 which projects from the end of the main housing 14. In order to insure the locking of the housing 14 in a fixed position for connection of the shaft of the revolving door, I provide members 36 which are secured by means of bolts 37 to portions of the rail system 31 with aligned recesses 36a therein into which the laterally extending bar member 38 may be set. Bar member 38 is secured to bracket member 39, one end of which is fixed to the sleeve member 40 which surrounds the shaft 21 carrying rollers 22. The fact that bar member 38 is engaged in recesses 36a insures the fixing of the main housing 14 in a position whereby the shaft 41 which connects with shaft 42 of the revolving door is directly centered over the lower bearing of the revolving door at the base of the drum.

The ceiling of the drum of the revolving door is indicated at 43 and it will be observed that one-half of the ceiling is provided with a slot 43a through which the upper end of tubular shaft 42 and depending end of shaft 41 are adapted to pass for permitting the revolving door assembly in collapsed position to be removed to one side of the drum.

The shaft 41 extends through an opening provided in housing 14 which is closed by collar 44. Collar 44 is surrounded by annular filler block 3 on which the annular ball race 20 is mounted and around which the ball bearings 45 are disposed for supporting upper ball race 46 which, in turn, supports the main gear 2. Main gear 2 has an upwardly extending flanged portion 2a which is provided with diametrically opposite recesses 2b which serve to receive the ends of stub shaft members 47 which project from ring member 48. Concentrically within ring member 48, I provide ring member 49 which fits snugly over shaft 41 and is keyed thereto by key member 50 operating in groove 41a of shaft 41. Ring member 49 is provided with laterally projecting pins 51 which enter openings in ring member 48 at diametrically opposite positions with respect to apertures which receive the pins 47. The nut 52 engages threads on shaft 41 and forms an abutment against ring member 49 thus supporting the entire weight of the revolving door structure. The nut 52 is keyed to shaft 41 with ring member 49 through key 50 as heretofore described. The main gear 2 is recessed as indicated at 2c to receive the upper end of cylindrical housing 44 thus forming a completely sealed casing through which shaft 41 extends and allowing lubricant to be packed around the roller bearings and gears within the housing 14. A felt or other form of packing may be inserted within housing 44 around shaft 41.

In the operation of speed control mechanism of my invention, movement is imparted to the wings of the revolving door by individuals who pass through the door and the shaft 41 revolved. Ring member 49 keyed to shaft 41 is correspondingly rotated and imparts rotary movement to ring member 48 through pin connections 51 therewith. Corresponding rotary movement is imparted to main gear 2 through pin connections 47. Main gear 2 meshes with gear teeth 4a on countershaft 4 which revolves in ball bearings. Countershaft 4 drives intermediate gear 5 which meshes with gear teeth on sleeve 12 imparting rotary movement to shaft 11 mounted in thrust bearings as at 13. For all normal conditions of rotation, centrifugal weights 8 will not be displaced for a sufficient distance to shift friction disc 6 into contact with asbestos brake lining 26. However, under conditions of abnormal speeds of the revolving door, centrifugal weights 8 are driven outwardly tending to raise friction disc 6. The centrifugal movement continues as the speed increases until friction disc 6 is engaged with brake lining 26 tending to retard the rotation of shaft 11.

In the event of abrupt arrest of the movement of the revolving door, such as might occur in the case where an individual becomes accidentally caught between one of the door wings and the drum, main gear 2 is correspondingly arrested in movement tending to arrest the movement of countershaft 4, intermediate gear 5, sleeve gear 12, and shaft 11. However, the carrier 10 and plate member 9 moving at the abnormal driving speed to which these members have been subjected, operate through clutch faces 9a and 7a to shift friction disc 6 into engagement with asbestos brake lining 26 to bring the entire door structure to an abrupt stop. The reason for this function will be understood by considering the construction of the coacting clutch faces 9a and 7a. These clutch faces are cut on an angle of approximately 60° with respect to the axis of the members.

Under normal conditions, the clutch member 7 constitutes the driver, clutch faces 7a and 9a form an interlocking engagement, and rotary movement is imparted to carrier 10 and plate 9 independently of the centrifugal action of weights 8 on friction disc 6. However, upon a reversal of the process which, in effect, occurs when shaft 11 is retarded in movement, the energy which has been stored in carrier 10, plate 9, and weights 8, tends to constitute the sloping faces 9a of clutch member 9 as coacting drivers which operate against the sloping faces 7a of the coacting clutch member 7 introducing in effect a cam movement tending to elevate sleeve 7 and the friction disc 6 carried thereby. This vertically upward movement is sufficient to effect an engagement between friction disc 6 and the asbestos brake lining 26 thus arresting movement of shaft 11. It will be observed that the mechanism of my invention functions not only to avoid racing of the revolving door, but to arrest movement of the revolving door under condition of obstruction. I have found the mechanism very effective for preventing pinching between the revolving door wing and the drum thus increasing the safety of the installation.

While I have described my invention in certain of its preferred embodiments, I desire that it be understood that modifications may be made and that no limitations upon my invention are intended other than are imposed by the scope of the appended claims.

What I claim as new and desire to secure by Letters Patent of the United States is as follows:

1. Speed control mechanism comprising in combination a driven shaft, a flywheel carrier concentrically disposed about said driven shaft, an annular clutch face on said flywheel carrier, a sleeve-like member having an annular clutch face coacting with the annular clutch face on said flywheel carrier, a driving connection between said driven shaft and said sleeve-like member whereby rotation of said driven shaft imparts corresponding movement to said flywheel carrier through said annular clutch faces, a friction disc having a sleeve-like portion mounted on the aforesaid sleeve-like member and shiftable with respect to said sleeve-like member into and out of engagement with a stationary brake surface disposed adjacent said shaft, and a multiplicity of pivotally mounted weights carried by said flywheel carrier and displaceable under centrifugal force for shifting said friction disc into engagement with said brake surface.

2. Speed control mechanism as set forth in claim 1 wherein said sleeve-like member is provided with a shoulder adapted to support the sleeve-like portion of said friction disc, said clutch faces being displaceable upon deceleration of said driven shaft with respect to said flywheel carrier for displacing said friction disc towards engagement with said stationary brake surface.

3. Speed control mechanism comprising a driven shaft, a pair of coacting members concentrically disposed about said driven shaft, said coacting members each terminating in coacting teeth angularly displaceable with respect to each other, a flywheel connected with one of said coacting members, means for driving said flywheel, centrifugally operated weights carried by said flywheel, a friction disc slidably connected with the other of said coacting members, a driving connection between the last mentioned one of said coacting members and said driven shaft, a brake surface disposed adjacent said friction disc, said centrifugally operated weights being displaceable under conditions of excessive speed of said flywheel for shifting said friction disc into engagement with said brake surface, and said ratchet teeth operating under conditions of different speeds in said driven shaft and said flywheel for driving said friction disc into engagement with said brake surface.

4. Speed control mechanism comprising a driven shaft, a brake for said shaft including a pair of brake elements, a plurality of actuating means for said brake automatically and selectively operative in accordance with the rotation of said shaft, means for connecting one of said brake elements directly to said shaft, and separate means for connecting the same brake element with each of the said actuating means.

5. Speed control mechanism comprising a driven shaft, a brake for said shaft including a member connected with said shaft and a cooperating member, a plurality of actuating means for said brake, separate means for connecting the first said brake member with each of the said actuating means, one of said actuating means constituting a driving means between said driven shaft and another of said actuating means.

6. Speed control mechanism comprising a shaft provided with a brake including a pair of brake elements, and a plurality of actuating means for said brake, separate means for connecting one of said brake elements with each of the said actuating means, one of said actuating means associated therewith comprising a driving means between the said shaft and another of said actuating means whereby the last said actuating means is operative in relation to the rotary speed of said shaft, the first said actuating means being so constructed and arranged as to be operative by the momentum of the last said actuating means with respect to said shaft.

7. Speed control mechanism comprising a driven shaft, a brake for said shaft including a pair of brake elements, centrifugal and momentum mechanisms for actuating said brake automatically and selectively operative in accordance with the rotation of said shaft, means for connecting one of said brake elements directly to said shaft, means for driving said centrifugal mechanism from said driven shaft including a connection through said momentum mechanism, and means for maintaining said connection relatively fixed during the operation of said centrifugal mechanism, said connection being displaceable in the operation of said momentum mechanism for actuating the said one of said brake elements.

8. Speed control mechanism comprising a driven shaft, a brake for said shaft including two brake elements, a plurality of actuating means for said brake automatically and selectively operative in accordance with the rotation of said shaft, and means for connecting one of said brake elements directly to said shaft, said actuating means being so formed that one portion of each is adapted to be energized by the rotation of said shaft and another portion of each is adapted to engage the said one of the brake elements at separate points respectively, whereby the energy derived from said shaft by said one portion may be transmitted to said brake by way of said other portion of the respective actuating means to retard the shaft.

THURLOE M. HAGENBOOK.